United States Patent [19]
Whitehead

[11] Patent Number: 5,293,831
[45] Date of Patent: Mar. 15, 1994

[54] BOAT MOORING DEVICE

[75] Inventor: Nelson J. Whitehead, 204 Kingslynn Dr., P.O. Box 263, King City, Ontario, Canada, L0G 1K0

[73] Assignee: Nelson J. Whitehead, King City, Canada

[21] Appl. No.: 895,048

[22] Filed: Jun. 8, 1992

[30] Foreign Application Priority Data

May 22, 1992 [CA] Canada ............... 2069205

[51] Int. Cl.⁵ .............................. B63B 21/00
[52] U.S. Cl. ............................... 114/230
[58] Field of Search ............... 114/218, 219, 230, 365, 114/366, 367, 368, 369, 370

[56] References Cited

U.S. PATENT DOCUMENTS

| | | | |
|---|---|---|---|
| 1,746,109 | 2/1930 | Edwards | 114/370 |
| 2,030,136 | 2/1936 | Carr | 114/370 |
| 2,387,352 | 10/1945 | Radick | 114/230 |
| 2,569,783 | 7/1948 | Smith | 114/230 |
| 2,996,033 | 8/1961 | Yordi | 114/230 |
| 3,019,759 | 10/1958 | Woods et al. | 114/230 |
| 3,122,120 | 2/1964 | Jorgenson | 114/230 |
| 3,177,838 | 4/1965 | Grimes | 114/230 |
| 3,546,961 | 12/1970 | Marton | 74/501 |
| 3,585,885 | 6/1971 | Carr | 81/177 F |
| 4,584,958 | 4/1986 | Green | 114/219 |
| 4,627,375 | 12/1986 | Davis et al. | 114/230 |
| 4,817,551 | 4/1989 | Matson | 114/230 |
| 4,977,846 | 12/1990 | Landa et al. | 114/230 |
| 5,046,442 | 9/1991 | Hay | 114/230 |
| 5,050,521 | 9/1991 | Stone | 114/230 |

FOREIGN PATENT DOCUMENTS

| | | | |
|---|---|---|---|
| 600539 | 6/1960 | Canada . | |
| 735217 | 5/1966 | Canada | 114/46 |
| 969814 | 6/1975 | Canada | 114/46 |
| 1203437 | 4/1986 | Canada | 114/59.7 |
| 1255099 | 1/1961 | France . | |

Primary Examiner—David M. Mitchell
Assistant Examiner—Stephen P. Avila
Attorney, Agent, or Firm—Marcelo K. Sarkis; Neil H. Hughes; Ivor M. Hughes

[57] ABSTRACT

A boat mooring device comprising a base, a shaft having two ends, connected to the base at one end thereof and having a tensioner connected to the shaft end distant the base, the tensioner comprising a wheel, one end of a rod connected to the wheel, and another end connected to one end of the at least two cables each being of a first predetermined length, at least two mating collars being of a second collective predetermined length shorter than the first predetermined length located with the cables, a connector to be connected to a receiver on a boat deck or hull located at the other end of the cables, wherein the wheel is move is moved in the first position tension is applied to the cables, causing the collars to matingly engage each other wherein the cables and the collars result in an overall length substantially equal to the selected second collective predetermined length forming a rigid member, wherein when the wheel is moved to a second position, the tension on the cables is relieved and the matingly engaged collars are relaxed resulting in an overall length equal to the first predetermined length wherein in the tensioned position, the cables cannot be manually bent or untensioned without moving the wheel to a second position.

20 Claims, 15 Drawing Sheets

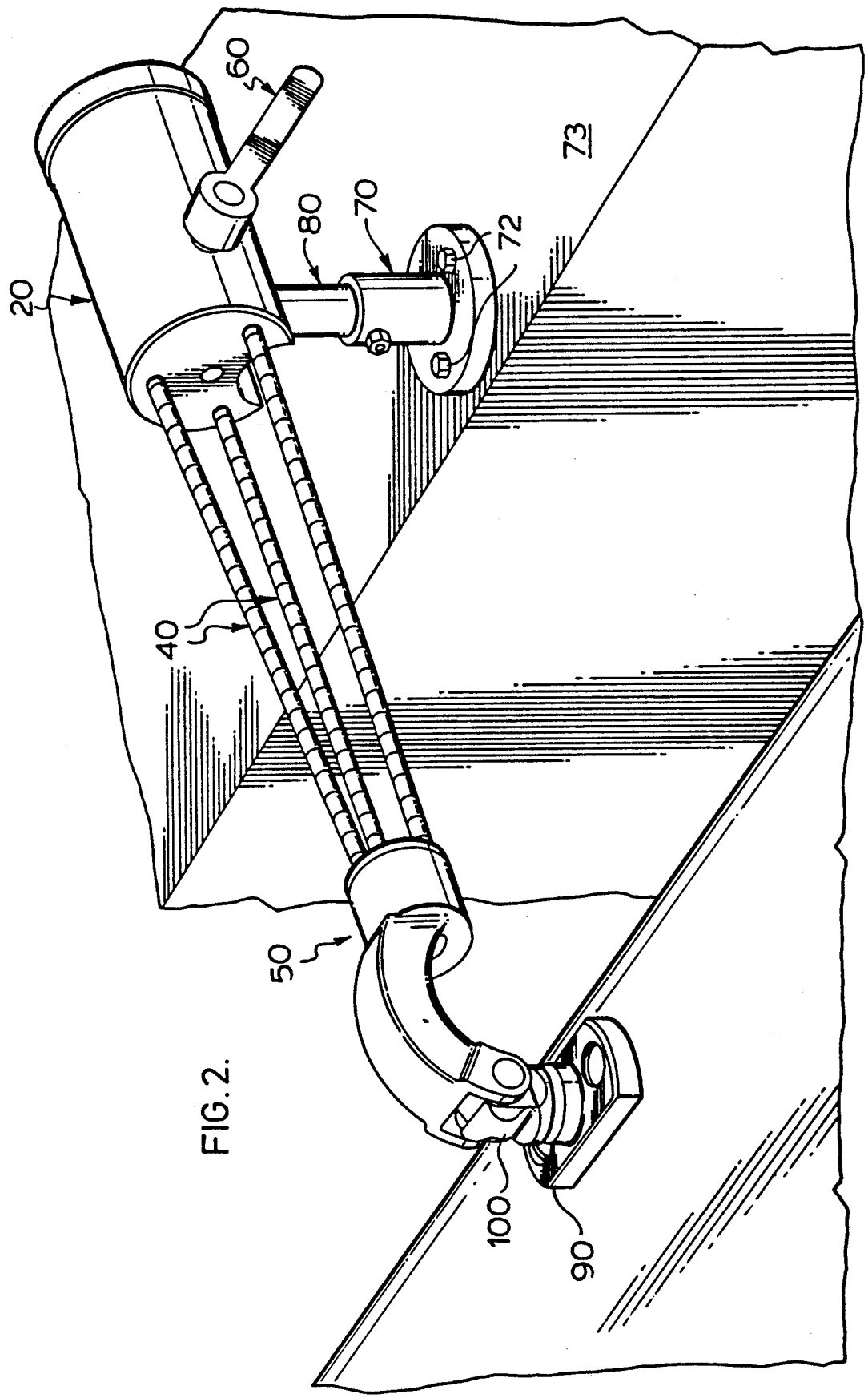

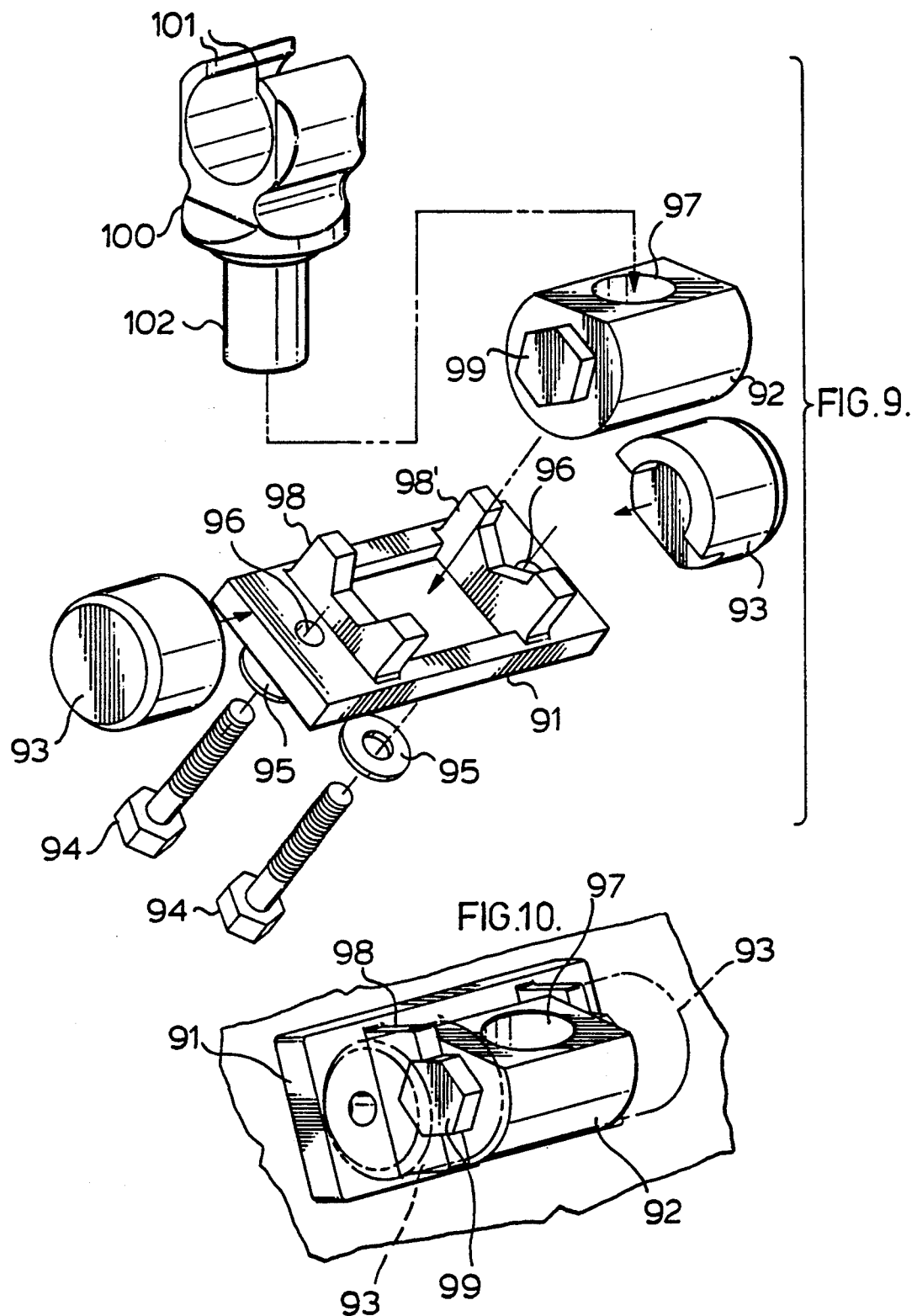

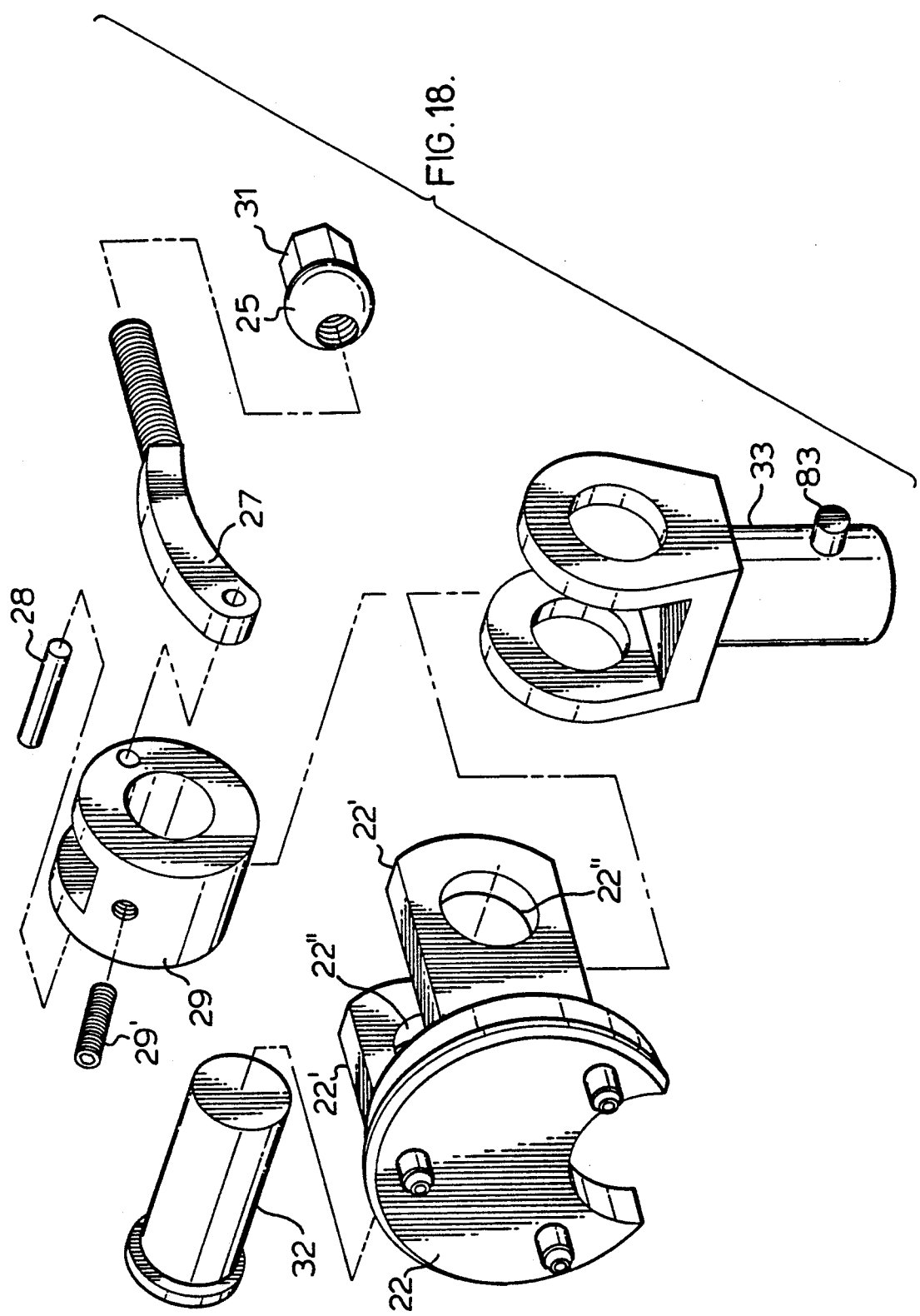

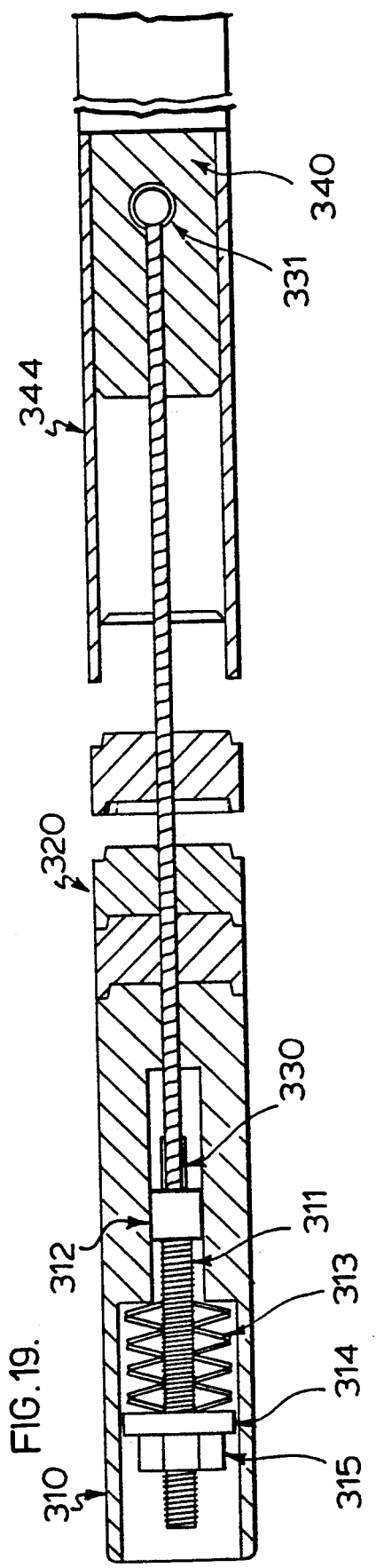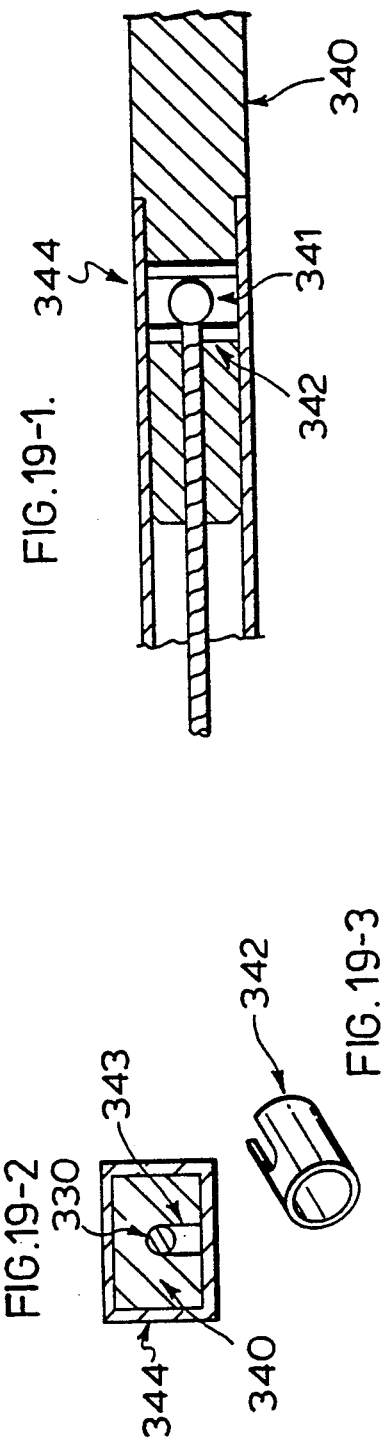

BOAT MOORING DEVICE

FIELD OF THE INVENTION

This invention relates generally to a collapsible member which can be made rigid. This invention may be applied in several fields comprising boat mooring systems, fishing poles, tripods, hockey sticks or the like and towing members or the like.

BACKGROUND OF THE INVENTION

In the mooring of boats and ships, the prior art has been to use a rigid arm to be pivotally connected to a dock and the other end having a connector to be connected to the boat or ship for docking and mooring purposes. The rigid connecting arm is difficult to attach to a boat, while the boat is violently rocking in turbulent water. Most of the prior art devices consist of latching mechanisms at the connector end which would appear to be difficult to attach to a boat in rough waters and appears to create a risk of possibly smashing the rigid arm mechanism through the hull of the boat or create the possibility of injuring the person trying to connect the mechanism in rough waters. Another draw back in the prior art is that in incorporating a rigid arm mechanism, you must reach well out from the dock in order to connect the mechanism. This may create a possible dangerous situation for the operator of the equipment as well. Another disadvantage of the prior art is that it does not allow sufficient movement of the attachment arm to accommodate the rise and fall of the water level in bodies of water.

Another common method in the prior art for mooring boats along the sides of docks and piers is tying the boat with ropes and preventing the boat from smashing or hitting against the dock by having a bumper or a rubber tire fixed between the boat and dock. A disadvantage of this method is that the constant movement of the boat will stretch or loosen the mooring ropes along the boat thus moving the boat to a position where it is not properly protected by the bumpers. Furthermore, the mooring ropes usually deteriorate over a period of time which creates the possibility that the ropes may break thus allowing the boat to drift away from the dock. Furthermore, incorporating the mooring methods of the prior art, as above, if the rope begins to deteriorate and the bumpers are disconnected from the boat, the boat could possibly be damaged by making hard contact with the dock.

The present invention in a preferred embodiment overcomes the disadvantages by providing a collapsible member in a boat mooring device or the like that can become rigid upon applying tension thereto and can become resilient upon relieving the tension thereupon.

SUMMARY OF THE INVENTION

It is an object of the invention to provide a collapsible member comprising a tensioning means, resilient means to be tensioned, said resilient means, preferably a strong cable or the like, being of a first predetermined length and being engaged with the tensioning means, rigidifying means, preferably a plurality of collars or a coil spring fitted over the resilient means, said rigidifying means being of a second collective predetermined length shorter than the first predetermined length located with said resilient means, and anchoring means to anchor an end of the resilient means to be tensioned, wherein moving said tensioning means to a first position provides sufficient tension of the resilient means such that the rigidifying means and the resilient means result in an overall length of said collapsible member substantially equal to the second collective predetermined length, wherein moving said tensioning means to a second position provides sufficient relief of tension of the resilient means such that the rigidifying means is untensioned resulting in an overall length of said collapsible member substantially equal to the first predetermined length, wherein in the tensioned position, the member cannot be manually bent or untensioned without moving said tension means to a second position.

In a preferred embodiment the coil spring has mating surfaces, such that the surfaces adjacent each other interengage when tension is applied to the resilient member, one engaging surface preferably having a male detent or the like, and the other engaging surface preferably having a complementary female groove or the like, such that when the resilient member is under tension, and the coil spring is compressed, the adjacent surfaces are interengaged by the male detent fitting into the female groove, thus forming a rigid member.

In yet still another preferred embodiment, the collapsible member is embodied in a hockey stick handle.

Yet still another object of the invention is to provide a hockey stick handle comprising a collapsible member comprising a tensioning means, preferably a nut and screw or means to convert rotational movement to linear movement, resilient means, preferably a strong cable or the like, to be tensioned, said resilient means being of a first predetermined length and being engaged with the tensioning means, rigidifying means, preferably a plurality of collars or the like fitted over the resilient means, being of a second collective predetermined length shorter than the first predetermined length located with said resilient means, and anchoring means to anchor an end of the resilient means to be tensioned, wherein moving said tensioning means to a first position provides sufficient tension of the resilient means such that the rigidifying means and the resilient means result in an overall length of said collapsible member substantially equal to the second collective predetermined length, wherein moving said tensioning means to a second position provides sufficient relief of tension of the resilient means such that the rigidifying means is untensioned resulting in an overall length of said collapsible member substantially equal to the first predetermined length, wherein in the tensioned position, the member cannot be manually bent or untensioned without moving said tension means to a second position.

In another preferred embodiment, the collapsible member is embodied in a mooring device wherein the resilient means is at least three steel cables or the like.

Yet another object of the invention is to provide a boat mooring device comprising a collapsible member comprising a tensioning means, resilient means, preferably a strong cable or the like, to be tensioned, said resilient means being of a first predetermined length and being engaged with the tensioning means, rigidifying means, preferably a plurality of collars or preferably a coil spring or the like fitted over the resilient means, being of a second collective predetermined length shorter than the first predetermined length located with said resilient means, and anchoring means to anchor an end of the resilient means to be tensioned, wherein moving said tensioning means to a first position provides sufficient tension of the resilient means such that the rigidifying means and the resilient means result in an overall length of said collapsible member substantially equal to the second collective predetermined length, wherein moving said tensioning means to a second position provides sufficient relief of tension of the resilient means such that the rigidifying means is untensioned resulting in an overall length of said collapsible member substantially equal to the first predetermined length, wherein in the tensioned position, the member cannot be manually bent or untensioned without moving said tension means to a second position.

In yet still another preferred embodiment, there is provided a boat mooring device comprising a base, a shaft having two ends, connected to said base at one end thereof and having a tensioner connected to the shaft end distant the base, said tensioner comprising a wheel, one end of a rod connected to said wheel, and another end of said rod connected to one end of at least two cables each being of a first predetermined length, at least two mating collars being of a second collective predetermined length shorter than the first predetermined length located with said cables, a connector to be connected to a receiver on a boat deck or hull located at the other end of the cables, wherein when the wheel is moved to a first position, tension is applied to the cables, causing the collars to matingly engage each other wherein said cables and said collars result in an overall length substantially equal to the second collective predetermined length forming a rigid member, wherein when the wheel is moved to a second position, the tension on the cables is relieved and the matingly engaged collars are relaxed resulting in an overall length equal to the first predetermined length wherein in the tensioned position, the cables cannot be manually bent or untensioned without moving said wheel to a second position.

Yet still another preferred embodiment provides a boat mooring device comprising a base, a shaft having two ends connected to said base at one end thereof and having a tensioner connected to the shaft end distant the base, said tensioner comprising means to convert rotational movement to linear movement connected to at least two cables each being of a first predetermined length, at least two mating collars being of a second collective predetermined length shorter than the first predetermined length located with said cables, a connector to be connected to a receiver on a boat deck or hull located at the other end of the cables, wherein when tension is applied to the cables, the collars matingly engage each other wherein said cables and said collars result in an overall length substantially equal to the second collective predetermined length forming a rigid member, wherein when the tension on the cables is relieved the matingly engaged collars are relaxed resulting in an overall length equal to the first predetermined length wherein in the tensioned position, the cables cannot be manually bent or untensioned without moving said wheel to a second position.

In any of the above mentioned embodiments, each collar or the like has two ends and the first end having a detent portion and preferably in the form of a male spigot, and the second end having a compatible detent portion and preferably in the form of a female spigot cavity, such that the male end of one collar engages and preferably fits into, the female end of another collar when tension is applied to the resilient member.

In any of the above mentioned embodiments, each collar further comprises a resilient biasing means preferably a rubber grommet or disc spring or the like preferably located with said female spigot cavity, to aid each collar in separating preferably to aid said male spigot in separating from said female spigot cavity when being untensioned or when already in the untensioned position.

A further object of the invention is to provide a cleat attachment for a boat hull or the like which can be mounted in angular positions to match the variety of angular positions of a boat deck or hull when moored, where the cleat attachment has a base or a pillow block or the like having receiving means for a journal block which is preferably cylindrical, said journal block further comprises a rotatably attached cleat which is able to rotate 360 degrees in the plane formed with the journal block, said journal having on each end thereof detent means to be received into the receiving means of the pillow block, preferably each detent means is a geometrically shaped polygon preferably a hexagon or octagon or the like, said receiving means preferably having a complementary geometrical shape to receive the detent means, preferably each receiving means is rotated such that each receiving means sits one half an index position out of location to the other, wherein when the journal block is rotated, the required angle for the attachment of a cleat connector is achieved to result in a secure attachment of the connector to the cleat, no matter what the angle of the boat deck or hull.

It is yet a further object of the invention to provide an attachment for a rope or capable or the like to adapt a rope or cable or the like such that it can be used with the cleat attachment, the attachment preferably comprising two mating parts which when assembled is fitted over the length of a rope or cable or the like and forms a member having preferably four sides where the two opposite sides are flat and planar and parallel to each other and the other opposite two sides are bowed outwardly.

Further and other objects of the invention will become apparent to a man skilled in the art from the following specification.

BRIEF DESCRIPTION OF THE DRAWINGS

FIG. 8-1 is a cross-sectional view of the collars in a preferred embodiment.

FIG. 9 is an exploded view of the cleat attachment parts.

FIG. 10 is a view of FIG. 9 with the cleat attachment assembled.

FIG. 17 is a perspective view of the collapsible member in another embodiment when used for towing vehicles or the like.

FIG. 18 is an exploded view of the parts of the tensioning device in one embodiment.

FIG. 19 is a side cross-sectional view of the hockey stick in one embodiment.

FIG. 19-1 is a side cross-sectional view of the hockey stick blade attachment in one embodiment.

FIG. 19-2 is a cross-sectional view of the replaceable blade when used with the hockey stick.

FIG. 19-3 is a perspective view of the sleeve for the replaceable blade.

DETAILED DESCRIPTION OF PREFERRED EMBODIMENTS OF THE INVENTION

Figure 1:
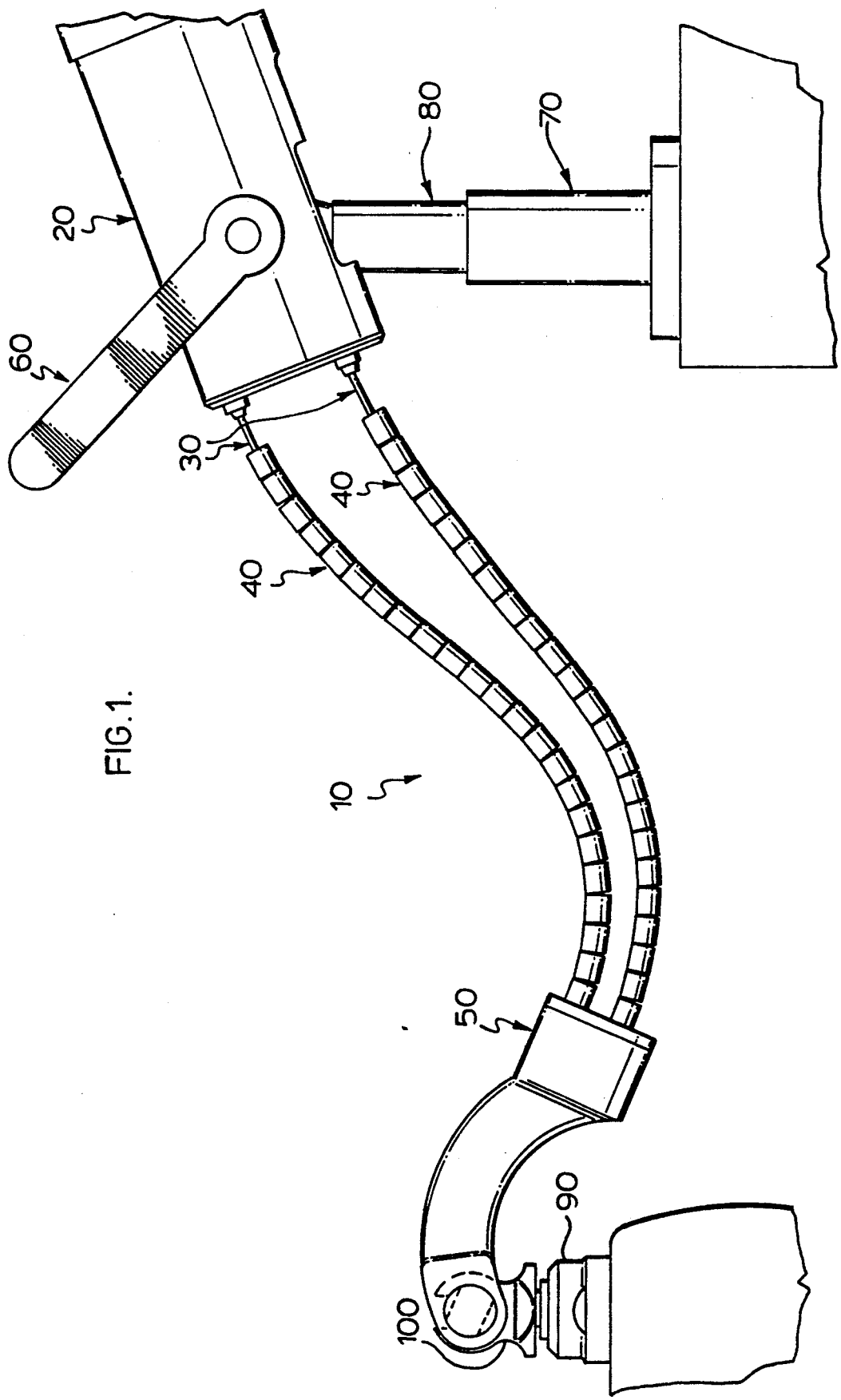
FIG. 1 is a side view of the collapsible member in a preferred embodiment in use as a boat mooring device in the collapse position.
Figure 7:
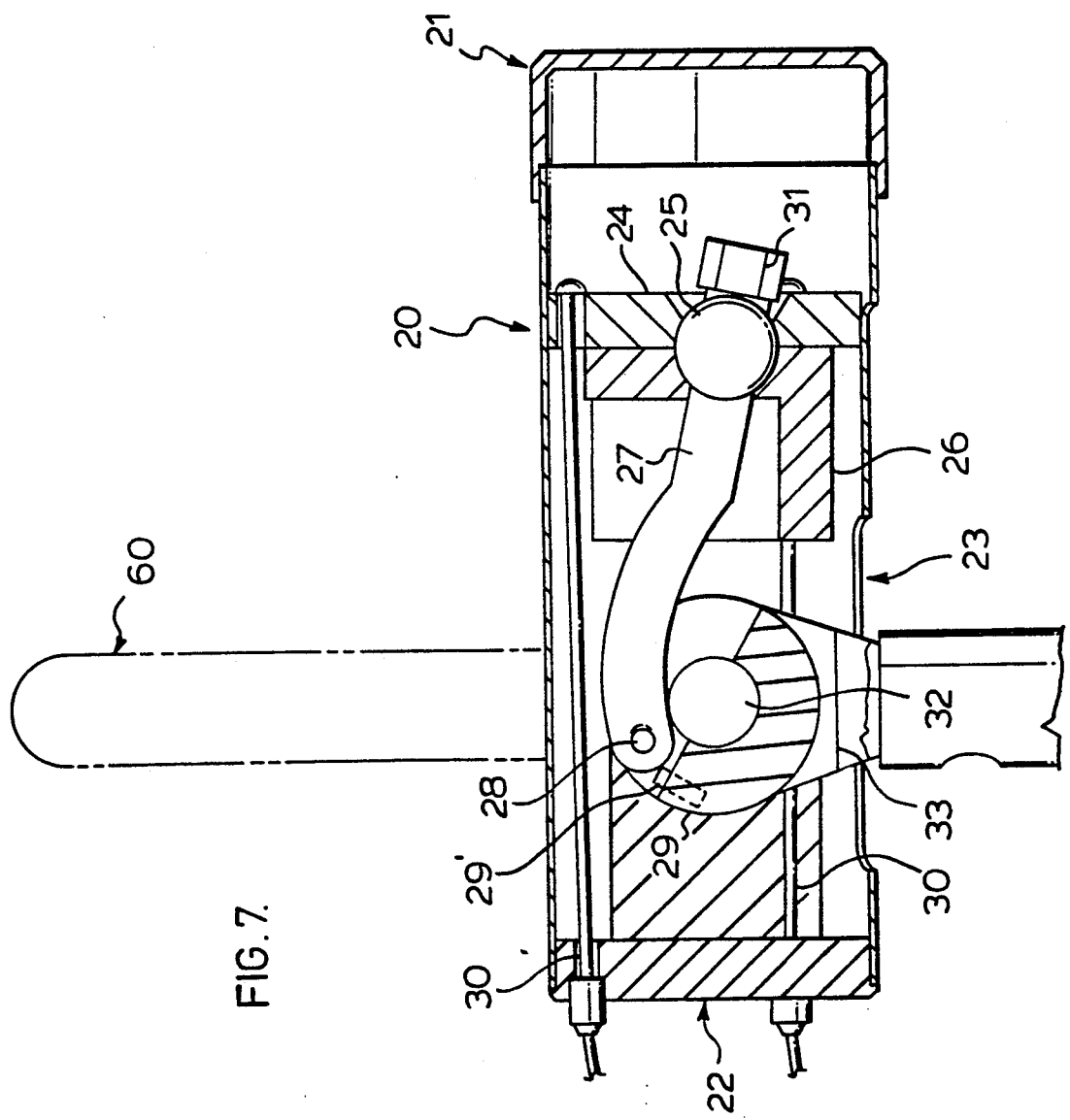
FIG. 7 is a partial cross-sectional view of the tensioning device in the untensioned position.
Figure 8:
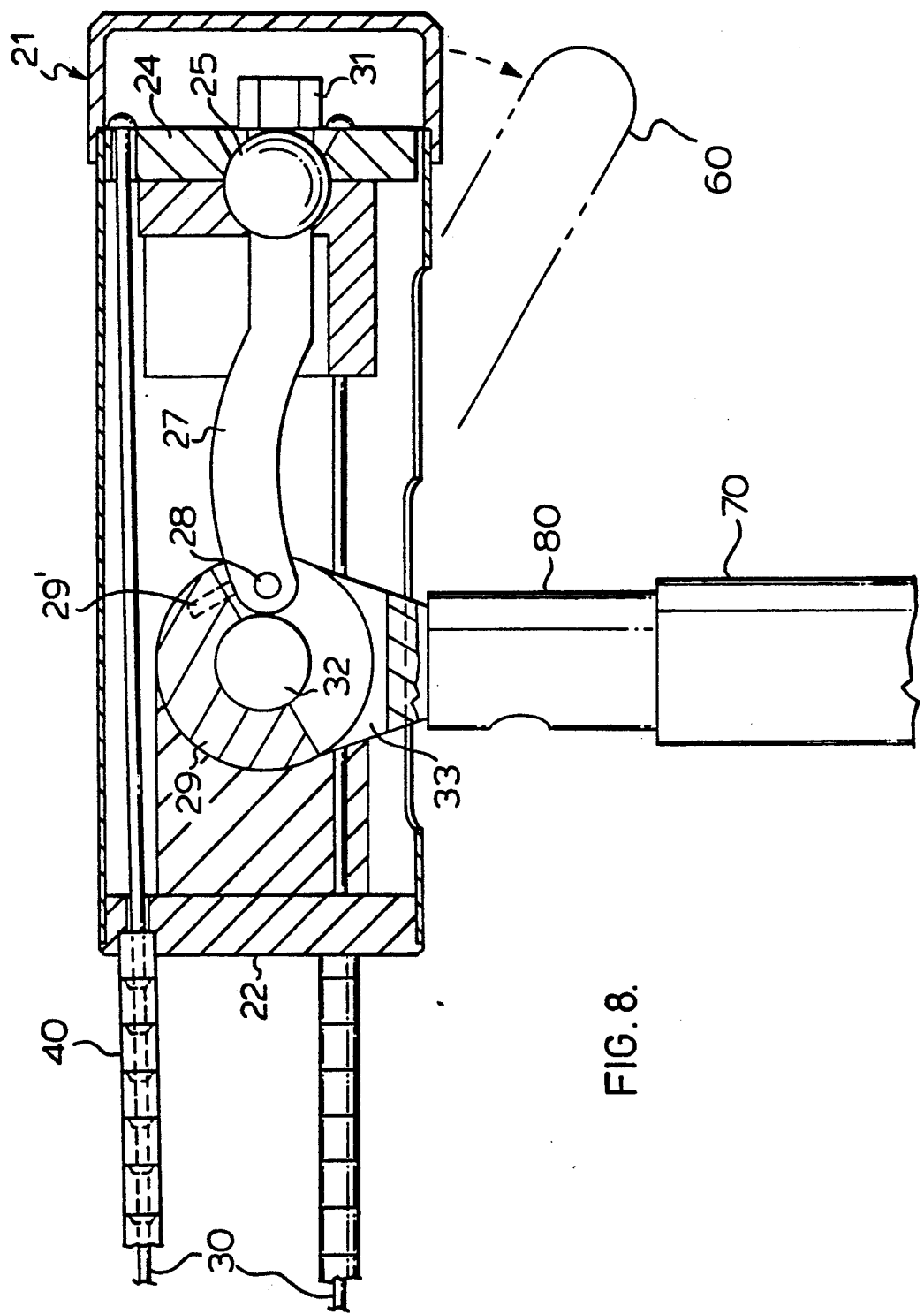
FIG. 8 is a partial cross-sectional view of the tensioning device in the tensioned position.
Figures 1, 8:
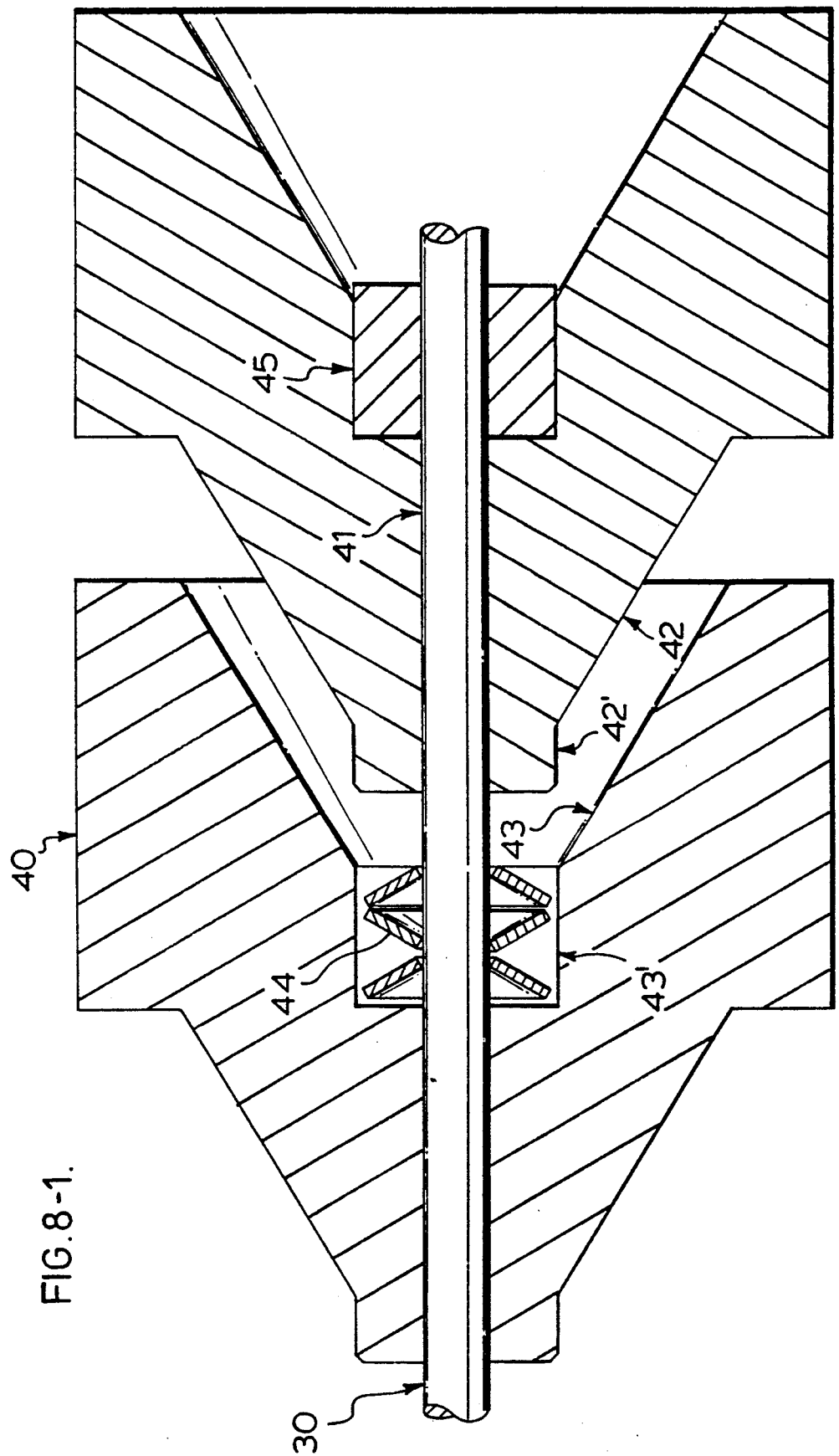
Figures 1, 11:
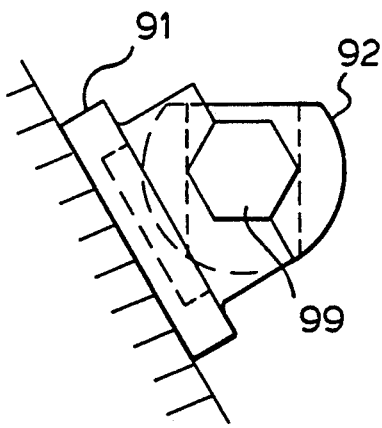
FIGS. 11.1, 11.2, and 11.3 are side views of the cleat attachment when assembled in different angular positions.
Figures 2, 11:
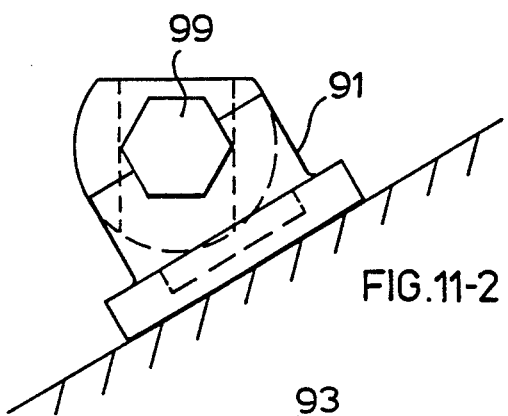
FIG. 2 is a perspective view of the collapsible member in a preferred embodiment in use as a boat mooring device in the rigid position.
Figures 3, 11:
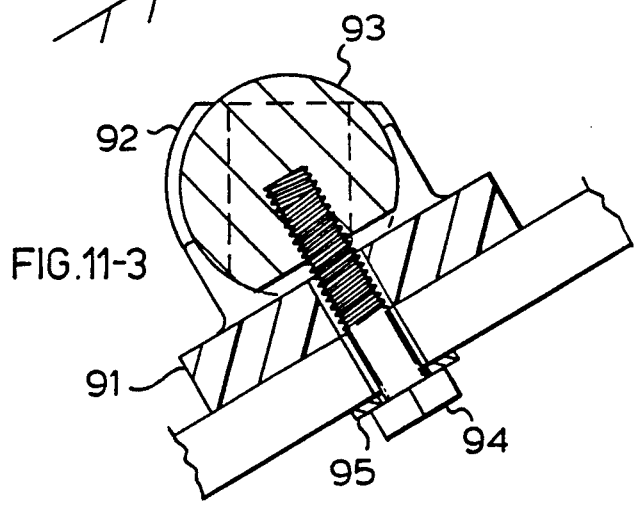

Referring to FIG. 1 and FIG. 2 there is seen a boat mooring device generally denoted as 10 having a tension housing 20 and attached thereto three resilient cables 30 preferably made out of steel or the like and each cable having a series of collars 40 running along the length of each of the cables 30. At the end of each of the cables 30 distant the tension housing 20 there is a connector 50 for connection to a cleat 100. The cables 30 are connected to the connector 50, such that the diameter formed by the end of the three cables 30 connected to the tension housing 20 is preferable two times greater than the diameter formed by the end of the three cables 30 connected to the connector 50 creating a substantially conically shaped shaft or the like when in the tensioned position. The collars 40 are kept on each of the cables 30 by the connector 50 and the front cap 22. In FIG. 1 the handle 60 located on the tension housing 20 and connected to pin 32 (as seen in FIGS. 7 and 8) is in a first position showing each of the resilient cables 30 and collars 40 in the collapsed and relaxed position. Referring now to FIG. 2, moving the handle 60 to a second position, the resilient cables 30 are tensioned and in turn the collars 40 interengage with each other forming a rigid member and in turn provide a fixed distance between the tension housing 20 and the cleat 100. As best seen in FIG. 8-1 in a preferred embodiment, each of the collars 40, preferably made of a suitable metal or the like, has a longitudinally central hole 41, a tapered male spigot 42 having a pilot or the like 42' at one end thereof and a mating tapered female cavity 43 having a complementary female pilot cavity 43' at the other end such that when tension is applied to the cables 30 the male spigot 42 and male pilot 42' interengages with the female cavity 43 and female pilot cavity 43' such that when sufficient tension is applied to the cables 30, a rigid member is formed. The male pilot once engaged with the female pilot cavity 43' also aids in the rigidity of the member in the tensioned position. The female pilot cavity 43' has located therein a substantially annular disc spring 44 or rubber grommet 45 or the like which aids the male spigot 42 and pilot 42' out of the female cavity 43 and female pilot cavity 43' respectively. The collars 40 can have different cross-sectional structures (i.e. a rectangular cross-section).

Figure 3:
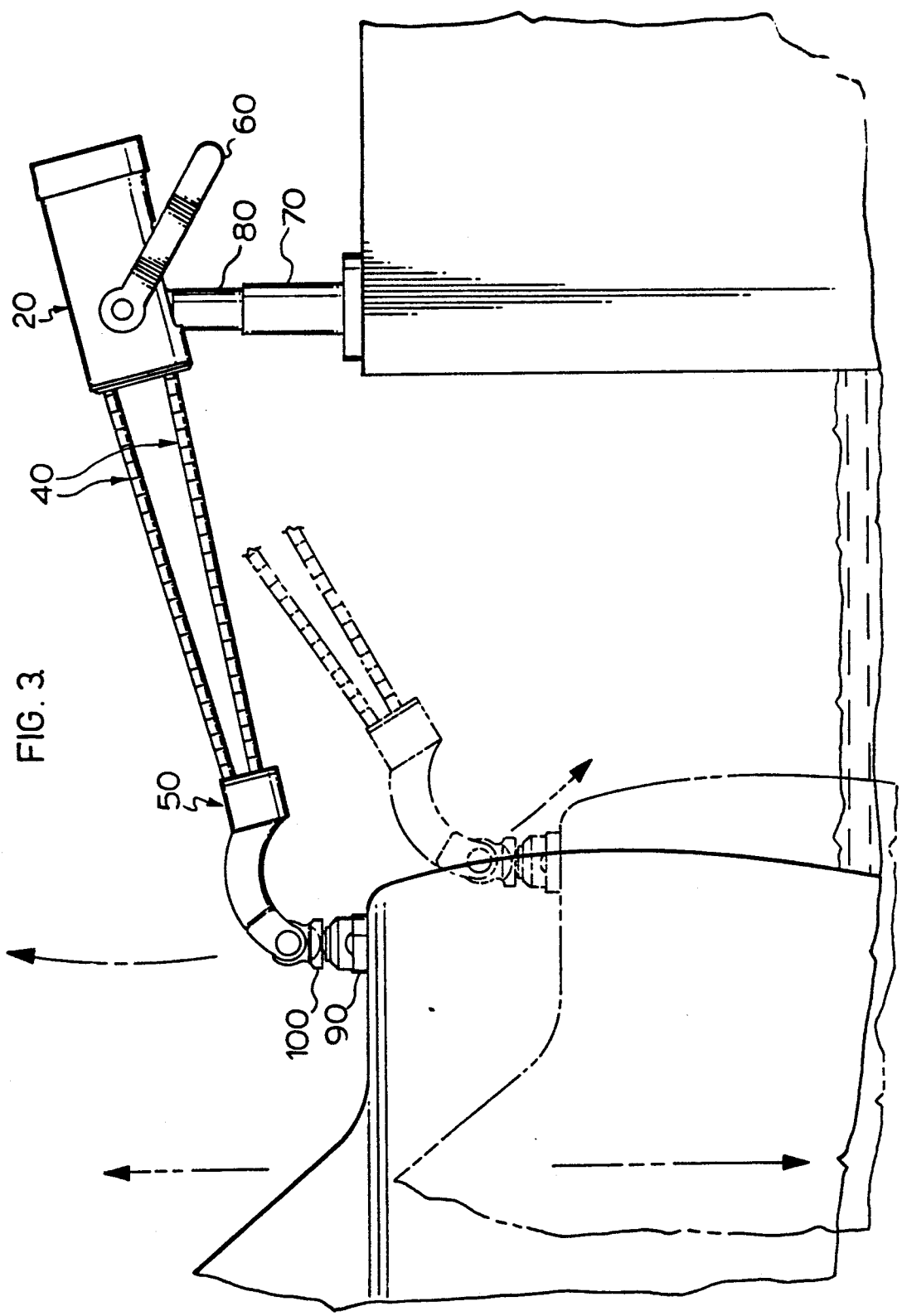
FIG. 3 is a side view of the invention in a preferred embodiment in use as a boat mooring device in the rigid position showing the invention and how it functions with the rising and lowering of the tide.
Figure 4:
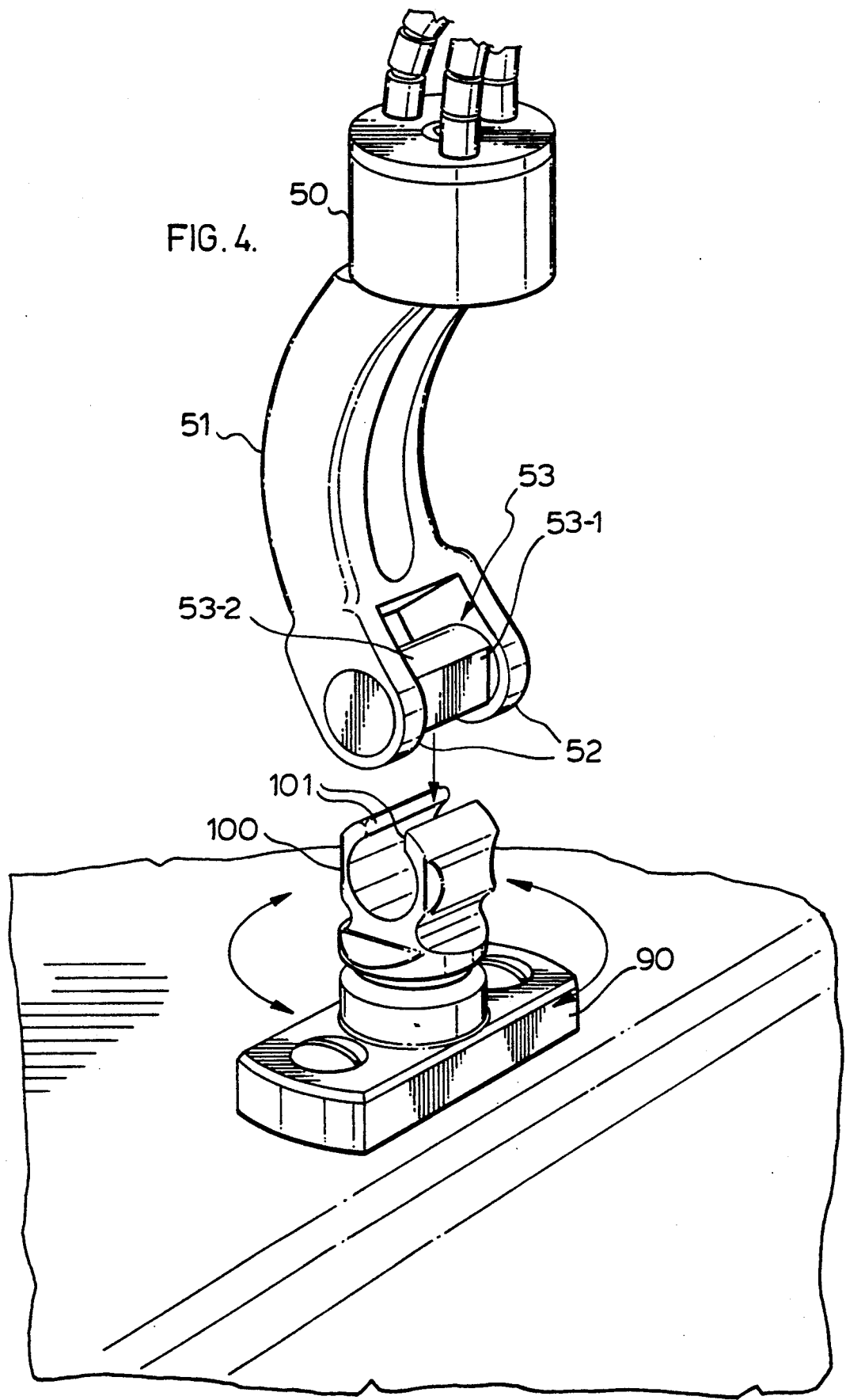
FIG. 4 is an exploded view of the insertion of the connector from the boat mooring device into the cleat.
Figure 5:
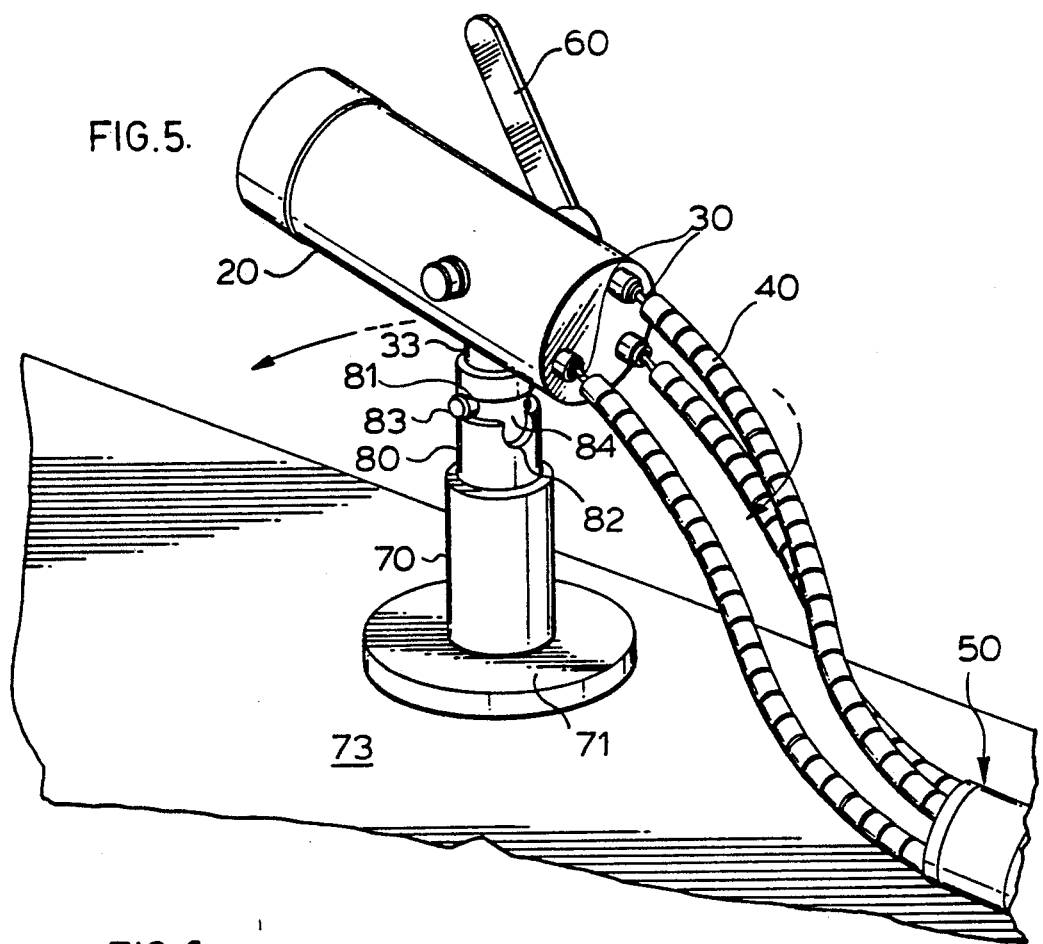
FIG. 5 is a perspective view of the boat mooring device in the collapse position and in the unlocked position.
Figure 6:
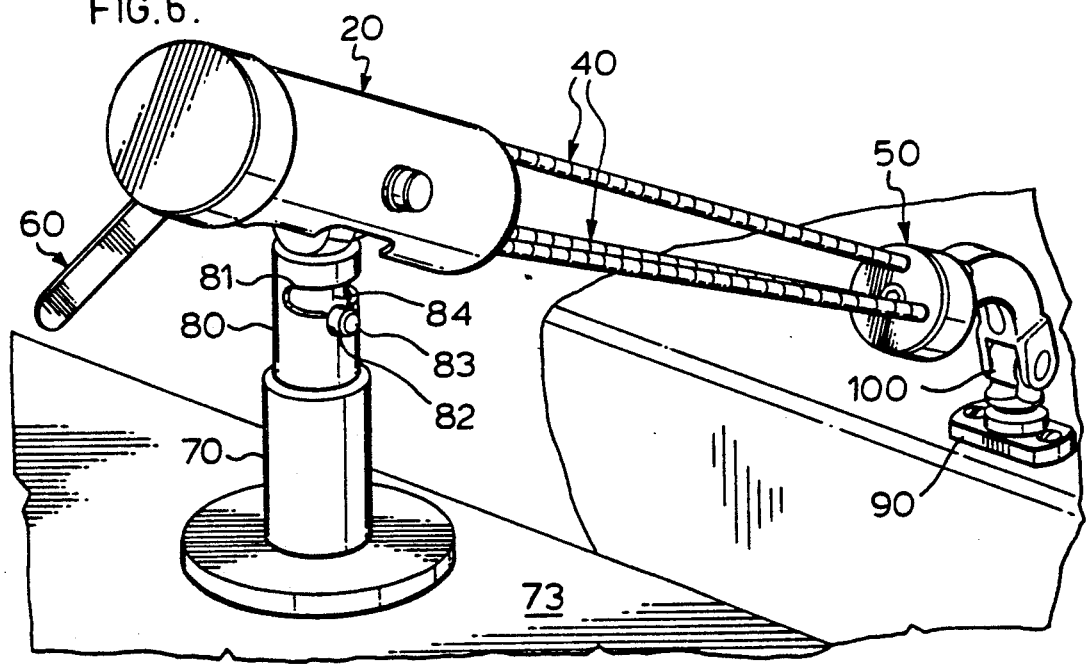
FIG. 6 is a perspective view of the boat mooring device in the locked and rigid position.

Referring now to FIGS. 2, 5, 6, 7 and 8 the mooring device is mounted to a platform such as a dock 73 by inserting a yoke 33 into a hollow shaft 80 which is inserted into a hollow shaft 70 having a circular base 71. Shaft 80 is locked into shaft 70 preferably by a nut and bolt or welding or the like. The hollow shaft 70 is connected to the dock by nuts and bolts 72 going through the base 71 and into the dock 73. Proximate the end of the shaft 80 distant the base 71 there is a slot 81 running horizontally for substantially 180 degrees around the shaft 80, and along the lower portion of the slot 81 there is a vertical slot 82 substantially shorter than the horizontal slot 81 and being substantially normal to the slot 81. Yoke 33 is connected to the tension housing 20. Yoke 33 has on the end distant the tension housing 20 a detent 83 which rides along the slot 81 to provide substantial horizontal movement of the tension housing 20 and locks into slot 82 to prevent horizontal movement of the tension housing 20 once the connector 50 has been connected to the cleat 100 and the cables 30 have been tensioned and the collars 40 rigidified. The yoke 33 end distant the detent 83 and proximate the tension housing 20 holds a camlock bushing 29 which is held in place by a pin 32. One end of a crank 27 is pivotally connected to the camlock bushing 29 by a pin 28. The other end of the crank 27 is threaded and connected to a ball joint. The ball joint 25 is inserted into a clamp plate 26 and tension plate 24 as best seen in FIGS. 7 and 8. The clamp plate 26 and the tension plate 24 both have a semi spherical cavity which when fastened together by a bolt or the like form a spherical cavity allowing for the spherical portion of the ball joint 25 to fit into the formed cavity. The ball joint 25 can move freely in the formed cavity. Referring now to FIGS. 7, 8 and 18 the cables 30 enter into the tension housing 20 via equidistant holes in the front cap 22 and terminate at the tension plate 24. A handle 60 is connected to the camlock bushing 29 via pin 32 which when said handle 60 is turned to a first position the camlock bushing 29 is caused to rotate and in turn the crank 26 is moved which in turn causes the tension plate 24 to move towards the end cap 21. On the camlock bushing 28 is located a stop screw 29' which can be adjusted against the top edge of the crank to obtain an ideal locked position. Since the cables 30 are connected to the tension plate 24 the movement of the tension plate 24 towards the end cap 21 causes the cables 30 to be tensioned which in turn causes the collars 40 on the cables 30 to matingly interengage with each other thus forming a rigid member. The tensioned position can best be seen in FIG. 8. Similarly to relieve the tension, moving the handle 60 to the original position will cause the camlock bushing 29 to rotate which in turn will cause the crank 27 to be moved towards the front cap 22 of the tension housing 20 which in turn will cause the tension plate 24 to be moved towards the front cap 22 of the tension housing 20 which in turn will relieve the tension on each of the cables 30 and will allow each of the collars 40 to separate and relax resulting in a flexible member. A nut 31 on the ball joint 25 is also used to tighten the cables 30 if after some use the cables 30 have stretched such that when the handle 60 is in the tensioned position there is not enough tension to cause the cables 30 to be tensioned enough to form a rigid member. The cables 30 are connected to the tension plate 24 in any suitable manner to prevent unwanted disconnection of the cables 30 from the tension plate 24. A preferred method to connect the cables 30 to the tension plate 24 is to provide a swage fitting (not shown) which is swaged to the ends of each of the cables 30. The end cap 21 is pressed over the housing 20 and is used to prevent exposure of the internal workings of the tension housing 20 to the elements and also to provide access to the nut 31 to tighten or loosen the cables 30 on the tension plate 24. The front cap 22 is also pivotally connected to the yoke 33 by the flanges 22', each flange having a hole 22" which is held in place on the yoke 33 by the pin 32 and allows the tension housing 20 to freely pivot vertically on the yoke 33 without affecting the camlock bushing 29 or the position of the tension plate 24. Thus, as best seen in FIG. 3, the tension housing 20 can pivot vertically while maintaining the tension on each of the cables 30. This allows the boat to rise and fall with the rising and lowering of the tide while moored. The connector 50 as best seen in FIG. 4 has an arcuate arm 51 at the end distant the cables 30. The arm 51 has two fingers 52 extending along the length of the connector 50 where the two fingers are connected to each other by a transverse member 53. The transverse member 53 has four sides with two opposite sides 53-1 being flat and planar and the other two sides 53-2 being bowed outwardly. The transverse member 53 is inserted into the cleat 100 where the flat and planar sides 53-1 of the transverse member 53 allow the transverse member 53 to fit into the opening 101 of the cleat 100. The transverse member 53 will not fit into the cleat 100 without rotating the connector 50 to align the planar and flat sides 53-1 of the transverse member 53 with the opening 101 of the cleat 100. Once the transverse member 53 is inserted in the cleat 100, rotation of the connector 50 90 degrees downwardly causes rotation of the transverse member 53 in the cleat 100 such that the outwardly bowed sides 53-2 of the transverse member 53 form a snug fit within the cleat 100 and disallows the removal of the connector 50 from the cleat 100 and also maintains the flat and planar sides 53-1 in a parallel relationship with the horizontal centre line of the tension housing 20 when the detent 83 is in the slot 82 and the handle 60 is in the tensioned position without rotation of the connector 50 90 degrees upwardly. The cleat 100 can rotate within the cleat base 90 along the horizontal plane to allow for ease of insertion during rough waters.

Furthermore, as best seen in FIG. 3, the tide can rise and fall and the mooring device will rotated in the vertical plane to allow for the rising and lowering of the tide and the transverse member 53 will rotate within the cleat 100 without being released from the cleat 100. In effect, the cleat opening 101 would have to be parallel to the flat and planar sides 53-1 of the transverse member 53 to be released. (i.e. the boat would have to be on its side.)

In use, it is preferred to have a boat mooring device near the front of the boat, and a boat mooring device near the back of the boat.

Figure 12:
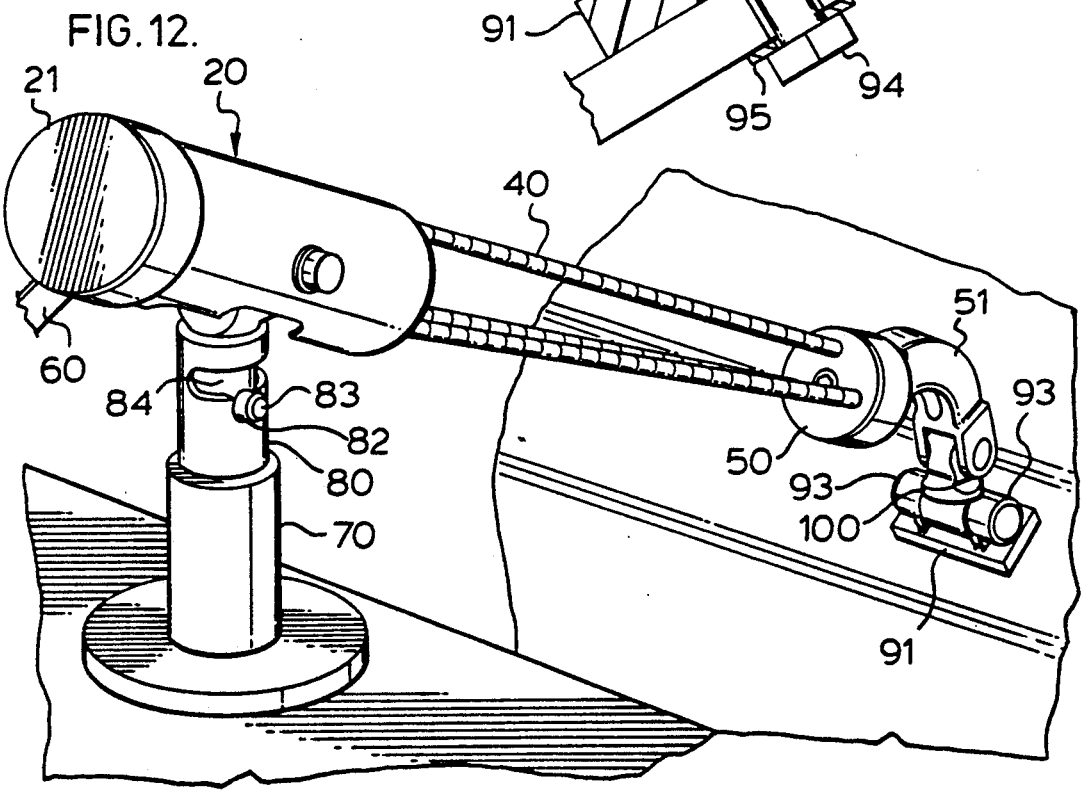
FIG. 12 is the boat mooring device in the locked and tensed position when used with the cleat attachment.

Referring now to FIG. 9 there is shown a preferred embodiment of the multi-angular boat cleat attachment comprising a rectangular pillow block 91 having two vertical legs 98 and 98' equally spaced on one face of the pillow block 91. Each leg has a geometrical shaped cutout (i.e. a hexagon, octagon, etc.) such that the cutout in one leg is offset one half of an index position out of location to its opposite leg. the pillow block 91 has two bolt holes 96 so the pillow block 91 can be bolted to the hull of a boat or ship. A cylindrical journal block 92 has two ends and each end has a journal 99 and 99' (not shown) corresponding to the cutout of each vertical leg 98 and 98' of the pillow block 91, such that the journals 99 and 99' fit in a mating relationship with the cutout of the vertical legs 98 and 98' respectively. The pillow block 91 also has a bored hole 97 running transverse and substantially normal to the length of the cylindrical journal block 92. The cleat 100 has a shaft 102 where said shaft 102 is inserted and rotatably fastened into the bored hole 97 to allow the cleat 100 to rotate 360 degrees in the plane formed with the journal block 92. The cylindrical journal block 92 and the cleat 100 when assembled are placed onto the pillow block 91 and held in place by clamp bushings 93 preferably with the same bolts 94 used to fasten the pillow block 91 onto the surface of a hull of a boat or ship. In use, the movement of the cylindrical journal block 92 within the pillow block 91 will allow the user to modify the journal block 92 such that the opening 101 of the cleat 100 when inserted into the bored hole 97 will be positioned in the required position regardless of the angular shape of the boat deck or hull. The number of angular position settings can be doubled by reversing the journal block 92, end for end, in the pillow block 91 due to the offset positions of the cutouts of the vertical legs 98 and 98'. FIGS. 11-1, 11-2 and 11-3 show the cleat attachment on various angled surfaces with the journal block 92 and the cleat 100 set in a preferred position. Fastening the clamp bushings 93 to the pillow block 91 will lock the position of the journal block 92 as desired. FIG. 12 shows the cleat attachment when used with the boat mooring device.

Figure 13:
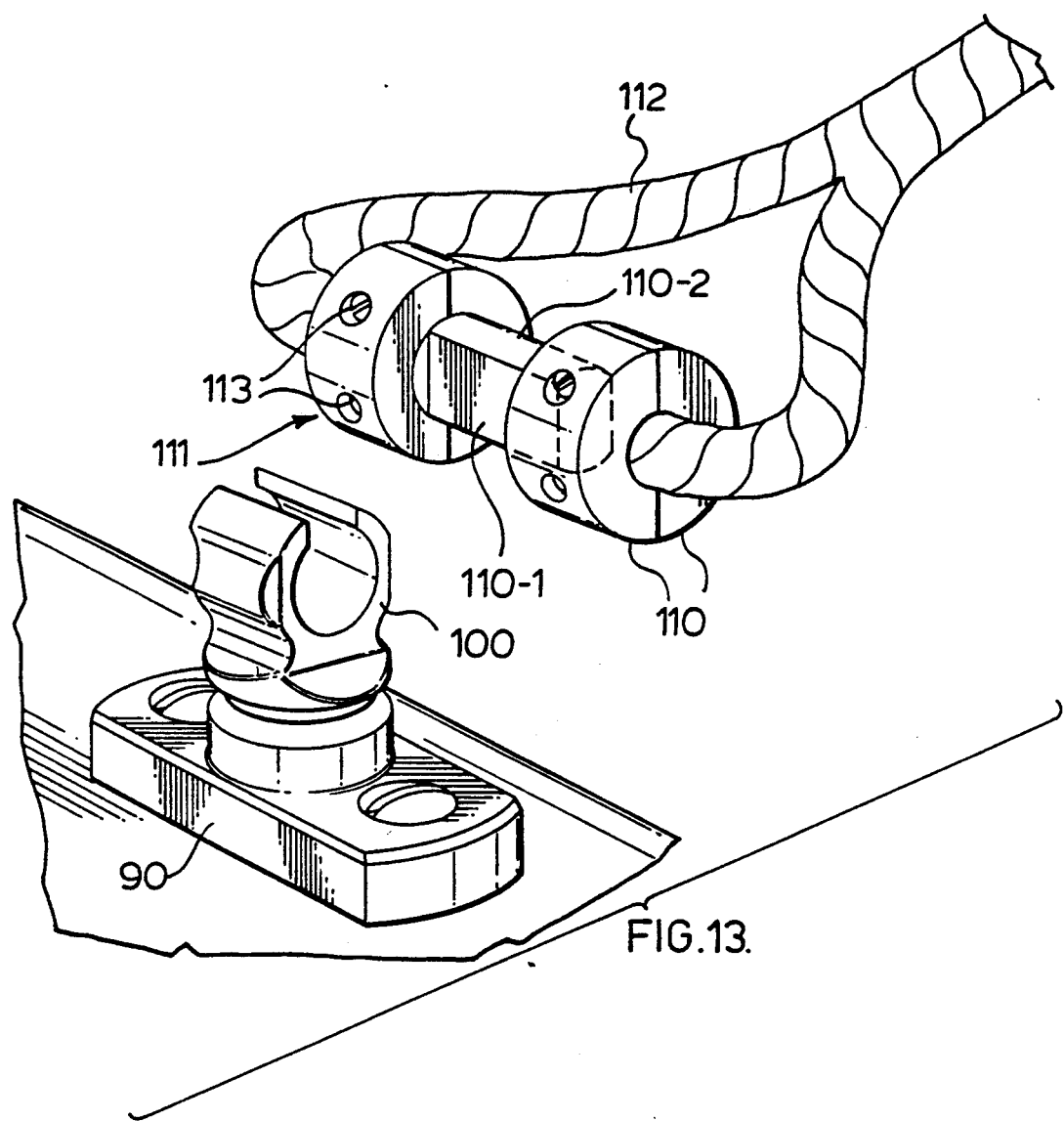
FIG. 13 is a perspective view of the attachment to adapt a rope or cable or the like for use with the cleat.

FIG. 13 shows an attachment 111 to adapt a rope 112 in order to use the rope 112 with the cleat attachment or the like, the attachment 111 is made of two mating pieces 110 that fit over a rope 112 to use the multi-angular adjustable cleat attachment or any cleat attachment with a conventional rope 112. The two mating pieces 110 are fastened together over the length of a rope 112 by four screws 113. The shape of the attachment when assembled is similar to the shape of the transverse member 53 having two flat and planar opposite sides 110-1 and two outwardly bowed sides 110-2 such that the attachment 111 can only fit into the cleat 100 when the two flat and planar sides 110-1 are aligned with the opening 101 of the cleat 100. Then upon rotation of the attachment 111 substantially 90 degrees, will cause the outwardly bowed sides 110-2 to be in a snug fit arrangement within the cleat 100.

Figure 14:
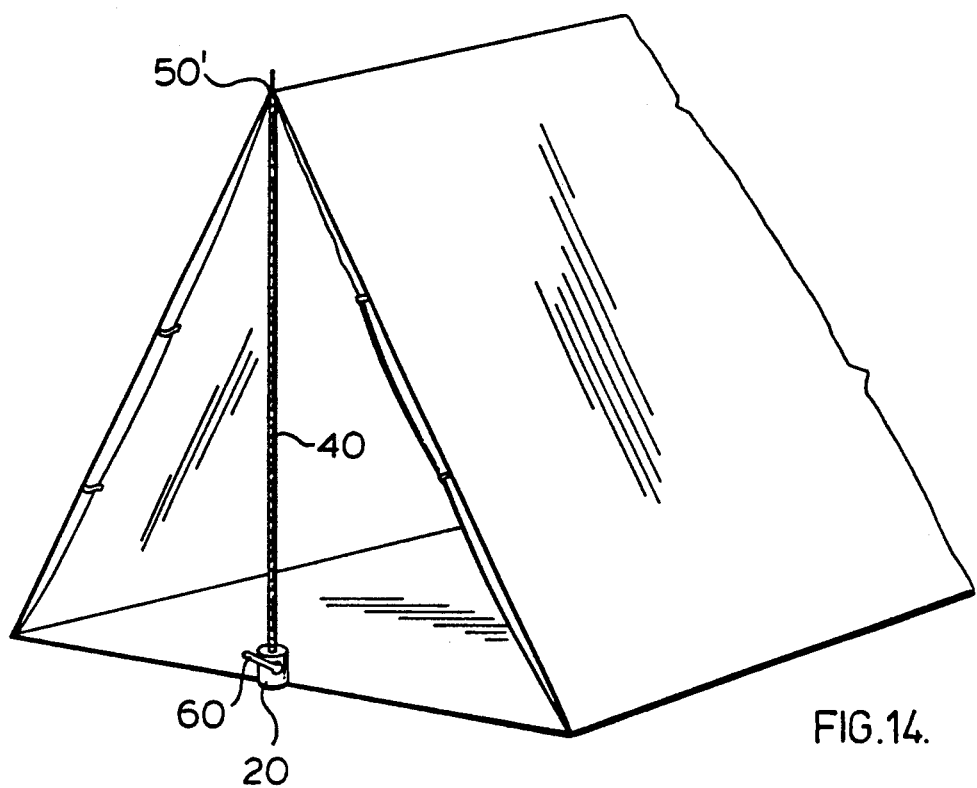
FIG. 14 is a perspective view of the collapsible member in another embodiment when used as a tent support.

FIG. 14 shows the invention used as a tent support or the like. The tension housing 20 has only one cable 30 fitted with a plurality of collars 40 and an anchor 50' to prevent the collars from slipping off the cable 30.

Figure 15:
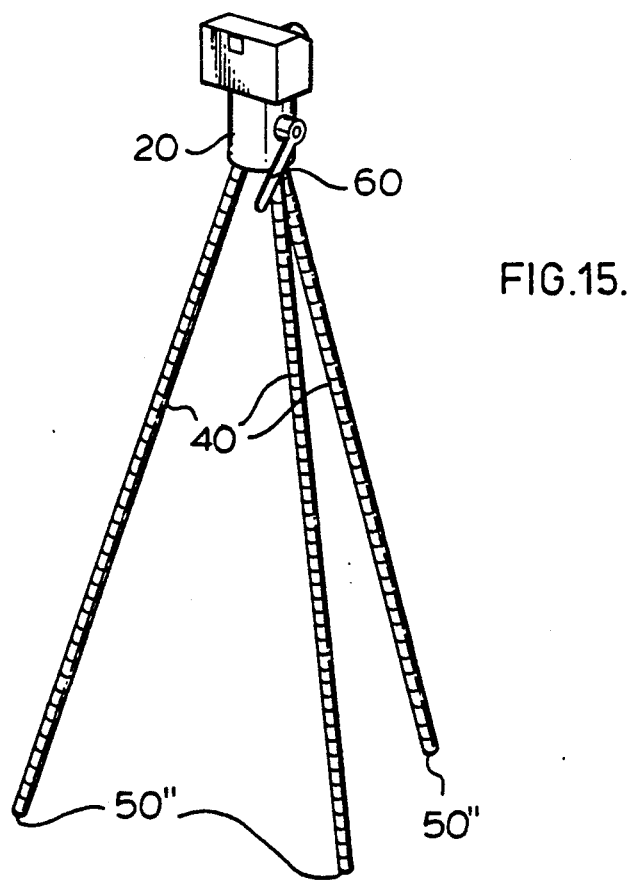
FIG. 15 is a perspective view where the collapsible member in another embodiment when used as a tripod to hold a camera.

FIG. 15 shows the collapsible member in use as a tripod to support in this instance a camera, however the tripod arrangement can be used to support other items. Here there is seen a tension housing 20 and three cables 30 connected thereto. The cables 30 are fitted with a plurality of collars 40 and there is a detent 50" at each cable end distant the tension housing 20 to anchor the collars on the cables 30.

Figure 16:
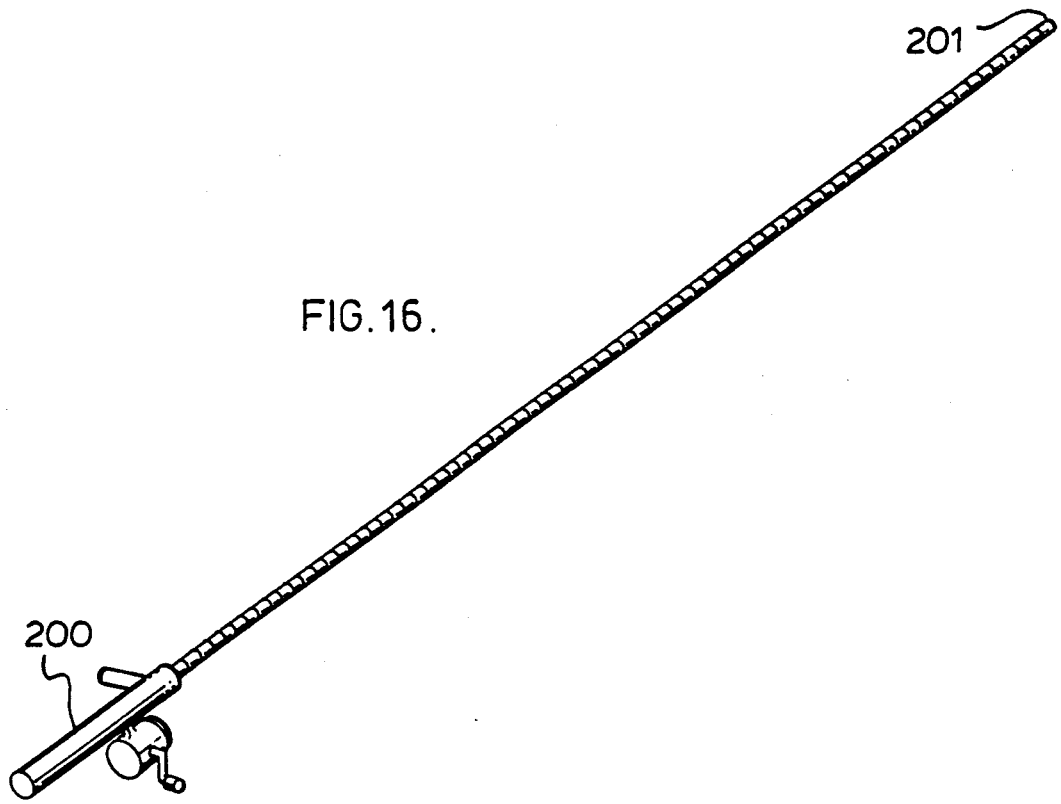
FIG. 16 is a side view of the collapsible member in another embodiment when used as a fishing rod.

FIG. 16 shows the collapsible member in use as a fishing rod, where the handle 200 is also the tension housing, and the rod portion of the fishing rod is made up of the collapsible member where at the end distant the handle 200 is a detent 201 to prevent the collars from slipping off the cable.

Figure 17:
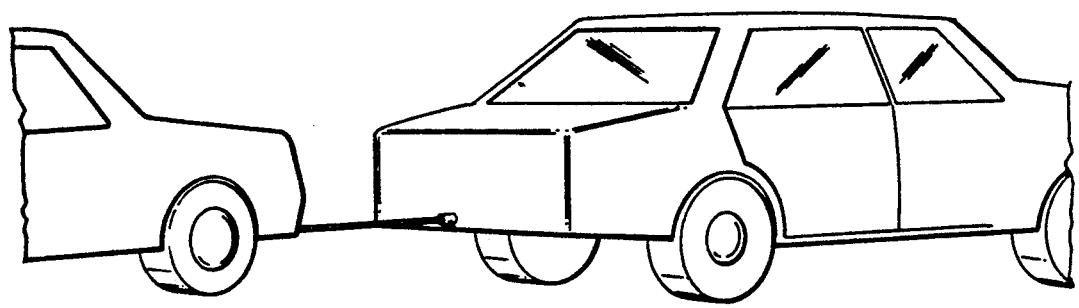

FIG. 17 shows the collapsible member when used as a towing device towing one car with another car.

Referring now to FIGS. 19, 19-1, 19-2, and 19-3 there is seen the collapsible member embodied in a hockey stick or the like. The hockey stick 300 has a handle 310 and a plurality of rectangularly cross-sectionally shaped collars 320 interconnected by a steal cable 330 or the like. The end of the cable 330 distant the handle 310 has a swaged ball fitting 331 which is fitted into a replaceable hockey blade 340. The hockey blade 340 has a transverse hole 341 which is fitted with a tubular sleeve 342 whose diameter is slightly greater than the diameter of the swaged ball fitting 331.

The tubular sleeve 342 has a slot along the length thereof. The width of the slot corresponds to the diameter of the cable 330. The tubular sleeve 342 is inserted into the transverse hole 341 of the blade 340. The blade 340 also has a slot 343 on one side thereof where the width of said slot 343 corresponds to the diameter of the cable 330.

The end of the cable 330 proximate the handle 310 is connected to a head 312 of a tension screw 311 which has a disc spring 313 fitted over the screw 311. The end of the screw 311 distant its head 312 has a washer 314 and a nut 315 connected thereto, such that the disc spring biases the tension screw 311 away from the swaged ball fitting 331.

When a blade 340 is to be connected to the hockey stick 300, the swaged ball fitting 331 is fitted into the tubular sleeve 342 and the portion of the cable 300 proximate the swaged ball fitting 331 is fitted into the slot 343. There is also provided a rectangular connector 344 which will allow the blade 340 to engage with the collar most proximate the blade 340 such that when rotation of the nut 315 connected to the tension screw 311 will tension the cable 330 and bring the blade 340 and the collars 320 into mating engagement resulting in a rigid hockey stick 300. The reverse procedure would be required in order to change the blade 340, or to store the hockey stick 300 in the collapsed position. The tensioning means although shown here as a nut and screw could also be a cam mechanism or the like similar to the tensioning means as described in the boat mooring device. Furthermore, the collars 320 may also include biasing means such as disc springs or rubber grommets or the like and male pilots and female pilot cavities as shown in FIG. 8-1.

The collapsible member can also be embodied in the following (not shown):

A cross bar for high jumping, because when in the tensioned state, it would eliminate the bowed condition which is common in the present poles being used.

A golf ball retriever handle, ski poles, lawn mower handle, rake/mop/or broom handle, extension handles for paint rollers and window washing equipment, legs for a camping cot or bed or tables, legs for portable sports chairs, ladders, pike pole for boats, extension handle for fish nets, handles for canoe paddles, tow bar for gliders, and masts for wind surfing boards.

As many changes can be made to the invention without departing from the scope of the invention, it is intended that all material contained herein be interpreted as illustrative of the invention and not in a limiting sense.

The embodiments of the invention in which an exclusive property or privilege is claimed are as follows:

1. A boat mooring device comprising a collapsible member comprising a tensioning means, resilient means to be tensioned, said resilient means being of a first predetermined length and being engaged with the tensioning means, rigidifying means being of a second collective predetermined length shorter than the first predetermined length located with said resilient means, and anchoring means to anchor an end of the resilient means to be tensioned, wherein moving said tensioning means to a first position provides sufficient tension of the resilient means wherein the rigidifying means and the resilient means result in an overall length of said collapsible member substantially equal to the second collective predetermined length, wherein moving said tensioning means to a second position provides sufficient relief of tension of the resilient means wherein the rigidifying means is untensioned resulting in an overall length of said collapsible member substantially equal to the first predetermined length wherein in the tensioned position, the member cannot be manually bent or untensioned without moving said tensioning means to a second position.

2. The boat mooring device of claim 1, where said resilient means is a cable.

3. The boat mooring device of any of claims 1 or 2, where said rigidifying means is a plurality of collars.

4. The boat mooring device of any of claims 1 or 2, where said rigidifying means is a coil spring.

5. The boat mooring device of claim 4 where said coil spring comprises mating surfaces, wherein the surfaces adjacent each other interengage when tension is applied to the resilient member, wherein when the resilient member is under tension and the coil spring is compressed, the adjacent surfaces are interengaged thus forming a rigid member.

6. The boat mooring device of claim 5 where said mating surfaces comprise one engaging surface having a male detent and another engaging surface having a complementary female groove wherein when the resilient member is under tension and the coil spring is compressed, the adjacent surfaces are interengaged by the male detent fitting into the female groove thus forming a rigid member.

7. The boat mooring device of claim 3 wherein each collar has two ends, and the first end having a detent portion and the second end having a compatible detent portion, wherein the detent portion of the first end of one collar engages the detent portion of the second end of a compatible detent portion of another collar when tension is applied to the resilient member.

8. The boat mooring device of claim 7 wherein the first end of each collar having a detent portion is in the form of a male spigot and the second end of each collar is in the form of a female spigot cavity, wherein the male spigot of one collar engages and fits into the female spigot cavity of another collar when tension is applied to the resilient member.

9. The boat mooring device of claim 8 wherein each collar further comprises a resilient biasing means to aid each collar in separating from each other when being untensioned or in the untensioned position.

10. The boat mooring device of claim 3 wherein each collar further comprises a resilient biasing means to aid each collar in separating from each other when being untensioned or in the untensioned position.

11. The boat mooring device of claim 10 where the resilient means is at least three cables.

12. The boat mooring device of claim 10 wherein the resilient biasing means is a rubber grommet.

13. The boat mooring device 10 wherein the resilient biasing means is a disc spring.

14. The boat mooring device of claim 1, where the resilient means is at least three cables.

15. The boat mooring device of claim 3 where the resilient means is at least three cables.

16. The boat mooring device of claim 4 where the resilient means is at least three cables.

17. The boat mooring device of claim 1 where said rigidifying means is a plurality of collars wherein each collar has two ends, and the first end having a detent portion and the second end having a compatible detent portion, wherein the detent portion of the first end of one collar engages the detent portion of the second end of a compatible detent portion of another collar when tension is applied to the resilient member, and wherein said resilient means is at least three cables.

18. The boat mooring device of claim 17 wherein each collar further comprises a resilient biasing means to aid each collar in separating from each other when being untensioned or in the untensioned position.

19. A boat mooring device comprising a base, a shaft having two ends, connected to said base at one end thereof and having a tensioner connected to the shaft end distant the base, said tensioner comprising a wheel, one end of a rod connected to said wheel, and another end of said rod connected to one end of at least two cables each being of a first predetermined length, at least two mating collars being of a second collective predetermined length shorter than the first predetermined length located with said cables, a connector to be connected to a receiver on a boat deck or hull located at the other end of the cables, wherein when the wheel is moved to a first position, tension is applied to the cables, causing the collars to matingly engage each other wherein said cables and said collars result in an overall length substantially equal to the second collective predetermined length forming a rigid member, wherein when the wheel is moved to a second position, the tension on the cables is relieved and the matingly engaged collars are relaxed resulting in an overall length equal to the first predetermined length wherein in the tensioned position, the cables cannot be manually bent or untensioned without moving said wheel to a second position.

20. A boat mooring device comprising a base, a shaft having two ends connected to said base at one end thereof and having a tensioner connected to the shaft end distant the base, said tensioner comprising means to convert rotational movement to linear movement connected to at least two cables each being of a first predetermined length, at least two mating collars being of a second collective predetermined length shorter than the first predetermined length located with said cables, a connector to be connected to a receiver on a boat deck or hull located at the other end of the cables, wherein when tension is applied to the cables, the collars matingly engage each other wherein said cables and said collars result in an overall length substantially equal to the second collective predetermined length forming a rigid member, wherein when the tension on the cables is relieved the matingly engaged collars are relaxed resulting in an overall length equal to the first predetermined length wherein in the tensioned position, the cables cannot be manually bent or untensioned without moving said wheel to a second position.

* * * * *